Figure 1:
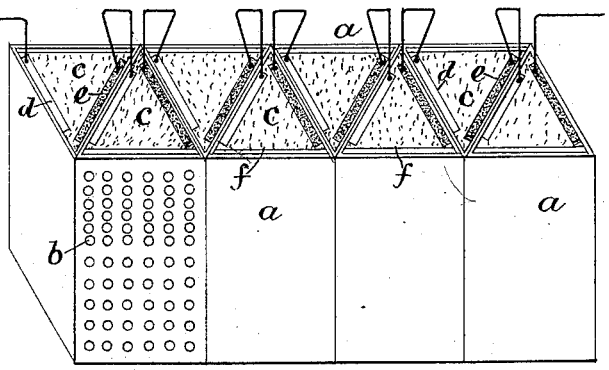

(No Model.)

T. CLELAND.
ELECTRIC BATTERY.

No. 303,560. Patented Aug. 12, 1884.

ATTEST:
J. A. Murdle
Wm. J. Kelley

INVENTOR:
T. Cleland
per J. A. Murdle
atty

UNITED STATES PATENT OFFICE.

THOMAS CLELAND, OF NEW YORK, N. Y., ASSIGNOR OF ONE-HALF TO ANNA E. PARK, OF SAME PLACE.

ELECTRIC BATTERY.

SPECIFICATION forming part of Letters Patent No. 303,560, dated August 12, 1884.

Application filed July 12, 1883. (No model.)

*To all whom it may concern:*

Be it known that I, T. CLELAND, a citizen of the United States, and a resident of New York, in the county of New York and State of New York, have invented certain new and useful Improvements in Electric Batteries, of which the following is a specification.

My invention relates to a new electric battery, of which a full and clear description will be given hereinafter.

If in a solution of chloride of ammonia, bichromate of potash, chloride of sodium, or other exciting or decomposing fluid the elements of a galvanic battery or voltaic pile are immersed, a current of electricity is generated. If these chemicals can be kept in a state of constant moisture without forming a solution, the result will be the same when in contact with the electrodes. It is a well-known fact that there are chemicals and chemical products that are termed "deliquescent" because their affinity for water is so great that they attract and absorb the moisture from the atmosphere. Such is particularly the case with potassium and many of the chemical preparations thereof. If, instead of the ordinary round or square battery-cells now in common use, a cell is made of a triangular shape, certain advantages are gained thereby. For instance, one of the broad sides of the cell can be used for the carbon or negative plate, which should always be much larger than the positive element, and the angle opposite for the zinc or positive plate. Space is economized in building up a series of these cells, the outside connections are made more readily and economically, less material is used as an excitant, and the cell is less liable to be broken than a square or round jar.

The first part of my invention consists of a compound composed of sal-ammoniac (chloride of ammonia) and acetate of potassium (potassii acetas) in proper proportions, to be used as the exciting material in a zinc carbon, zinc platinum, or other form of battery, in place of the liquid solution of sal-ammoniac or other solutions now used.

The second part of my invention consists of a triangular-shaped vessel provided with or without perpendicular corrugations on the interior thereof. Said vessel is also provided with a lining composed of flat pieces of cork or other porous material, upon which the exciting compound is packed, and into which elements of a voltaic pile or galvanic battery are inserted.

The third part of my invention consists of a vessel having its wall perforated, instead of perpendicular corrugations, and lined with sheets of porous material, for the purpose as described in my second statement of invention.

Figure 2:
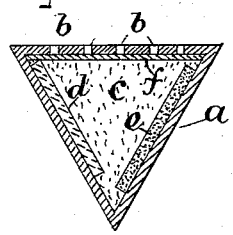
Figure 3:
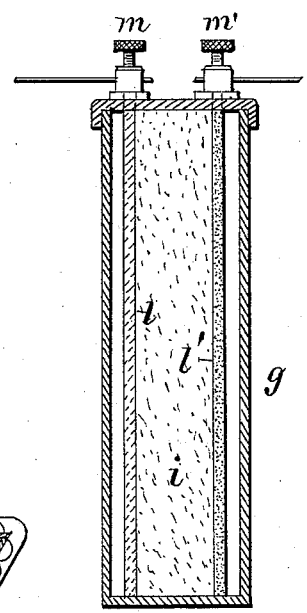
Figure 3:
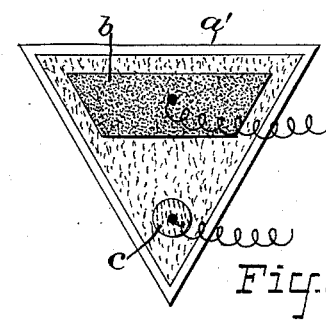
Figure 5:
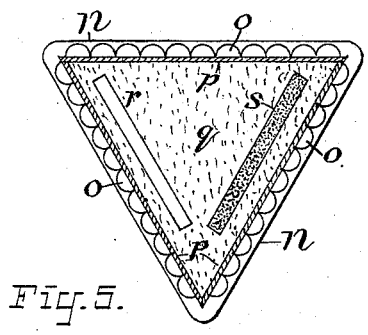
Figure 4:
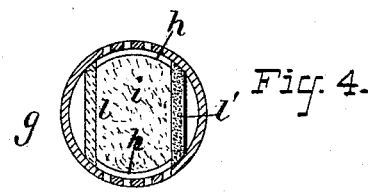

In the drawings, Figure 1 represents a series of triangular cells. Fig. 2 is a transverse section through a single cell. Fig. 3 represents a vertical section of a cylindrical-shaped cell. Fig. 4 represents a transverse section of Fig. 3. Fig. 5 represents a transverse section of the triangular cell having the perpendicular corrugations. Fig. 6 represents the triangular cell, showing the form which I prefer to use in practice.

Similar letters refer to similar parts throughout the drawings, in which—

$a$, Figs. 1 and 2, represents the triangular-shaped cell, provided with perforations $b$. In this case the perforations appear on one side; but I may have them on each side when the entire body of the electrodes is covered by the exciting compound $c$, which is represented here as being in contact with one side of each electrode $d\ e$. The exciting compound absorbs the moisture from the atmosphere, which penetrates the sheet of porous material, $f$. Said porous sheet $f$ prevents the compound from falling through the perforations $b$.

In Figs. 3 and 4, $g$ represents a cylindrical glass jar, provided with perforations covered on the interior of the cell by means of the porous sheet $h$, which holds the exciting compound $i$ in place. $l\ l'$ are the electrodes, each having one of its sides in contact with the compound $i$. Said electrodes pass up and through a glass cover, and are connected with their respective binding-posts $m\ m'$.

In Fig. 5 is represented a transverse section of a triangular cell, $n$, provided with vertical corrugation $o$ on the interior thereof. $p$ are the flat sheets of porous material upon which the exciting compound $q$ is packed. $r\ s$ are the electrodes, having their entire surfaces covered by the exciting compound. In this case the top edge of the cell should also be corrugated, so as to admit the atmosphere to the corrugations $o$ when mounting the cell with its cover.

In Fig. 6 is represented a triangular cell with the carbon zinc, being the form which I prefer in practice. In this figure $a'$ is the cell, $b'$ is the carbon electrode, and $c'$ the zinc.

It will be obvious that when two electrodes are in contact with one and the same compound composed of deliquescent and non-deliquescent material, as herein described, will, where the two electrodes are electrically connected with each other, produce a current of electricity the intensity and quantity of which will be in accordance with the amount and strength of the exciting compound, which I may increase or diminish as the case may require.

It has been fully demonstrated by practical experience that the liquid batteries heretofore used were to be kept in a state of rest in order to perform their functions properly. Consequently they could not be used successfully upon moving bodies—such as steamers, railroad-cars, vehicles, &c.—without causing great damage by the overflow of the exciting-liquid and by causing a disturbance thereof.

I am aware that deliquescent salts have heretofore been mixed with sand or finely-prepared earth and placed around porous vessels containing the plates of a battery in holes in the ground, the positive plate being in one hole and the negative in another. This invention, however, has not the least bearing upon my battery, as the inventor does not make the combination of a deliquescent salt with a non-deliquescent but exciting salt; nor would such an arrangement as his answer the main purpose for which my battery was designed.

I am also aware that deliquescent metal—sodium or potassium—as a positive or generating plate in the battery, has heretofore been used, but not for the purpose, as designed in my battery, of producing moisture in order to hold an exciting but non-deliquescent salt in slow solution, that it may act upon an ordinary zinc or other generating plate in a battery precisely the same as any other exciting-fluid would do.

Having thus described my invention, what I claim as new, and desire to secure by Letters Patent, is—

1. In combination with the elements of a voltaic pile or galvanic battery, a compound composed of a deliquescent salt or other chemical having deliquescent properties, combined with one or more other chemicals non-deliquescent but having decomposing and exciting properties.

2. In a battery-cell, a triangular-shaped vessel provided with air channels or apertures, and having a secondary casing of porous material, containing the exciting compound encircling the elements of a voltaic pile or galvanic battery.

3. In combination with the elements of a voltaic pile or galvanic battery, substantially as shown and described, the cell $n$, vertical corrugation $o$, secondary porous casing $p$, and exciting compound $q$.

4. A triangular-shaped cell filled with a compound having deliquescent and non-deliquescent properties, in combination with the elements of a voltaic pile or galvanic battery.

Signed at New York, in the county of New York and State of New York, this 11th day of July, A. D. 1883.

THOMAS CLELAND.

Witnesses:
  J. A. HURDLE,
  E. WM. EDWARDS.